United States Patent
Levy et al.

(10) Patent No.: US 12,289,502 B2
(45) Date of Patent: *Apr. 29, 2025

(54) MULTIPLE CORE SOFTWARE FORWARDING

(71) Applicant: Harmonic, Inc., San Jose, CA (US)

(72) Inventors: Adam Levy, Pardes Hana-Karkur (IL); Pavlo Shcherbyna, Kyiv (UA); Alex Muller, Pardes Hana-Karkur (IL); Vladyslav Buslov, Kiev (UA); Victoria Sinitsky, Haifa (IL); Michael W. Patrick, Assonet, MA (US); Nitin Sasi Kumar, San Ramon, CA (US); Anton Grichina, Kyiv (UA)

(73) Assignee: Harmonic, Inc., San Jose, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 17/684,984

(22) Filed: Mar. 2, 2022

(65) Prior Publication Data
US 2022/0224989 A1 Jul. 14, 2022

Related U.S. Application Data

(63) Continuation-in-part of application No. 17/556,733, filed on Dec. 20, 2021, now abandoned, which is a continuation of application No. 15/644,823, filed on Jul. 10, 2017, now Pat. No. 11,212,590.

(60) Provisional application No. 62/360,848, filed on Jul. 11, 2016.

(51) Int. Cl.
*H04N 21/61* (2011.01)
*H04B 1/707* (2011.01)
*H04L 65/611* (2022.01)
*H04L 67/1038* (2022.01)

(52) U.S. Cl.
CPC ..... *H04N 21/6118* (2013.01); *H04L 67/1038* (2013.01); *H04N 21/6168* (2013.01); *H04B 1/707* (2013.01); *H04L 65/611* (2022.05)

(58) Field of Classification Search
CPC .................................................. H04N 21/6118
See application file for complete search history.

(56) References Cited

U.S. PATENT DOCUMENTS

| 7,643,753 | B2 * | 1/2010 | Weitz ............. H04L 49/9094 398/67 |
| 8,397,238 | B2 | 3/2013 | Venkumahanti et al. |
| 9,258,237 | B1 * | 2/2016 | Smith ............... H04L 47/122 |
| 9,465,619 | B1 * | 10/2016 | Rottenstreich ........ G06F 9/3836 |

(Continued)

FOREIGN PATENT DOCUMENTS

KR 10-0652017 B1 11/2006

*Primary Examiner* — Abdeltif Ajid
(74) *Attorney, Agent, or Firm* — Brokaw Patent Law PC; Christopher J. Brokaw

(57) ABSTRACT

Approaches for processing packets transmitted within a Passive Optical Network (PON) using executable software. Processing packets within a PON may be performed by classifying one or more packets, of a plurality of received packets, to a particular PON system component, and then processing the one or more packets classified to the same PON system component on a single physical or virtual processor. The one or more packets may be forwarded between a sequence of one or more software stages. The software stages may each be configured to execute on separate logical cores or on a single logical core.

28 Claims, 4 Drawing Sheets

(56) References Cited

U.S. PATENT DOCUMENTS

| | | |
|---|---|---|
| 11,212,590 B2 | 12/2021 | Levy |
| 2009/0285233 A1 | 11/2009 | Al-Banna |
| 2010/0005500 A1 | 1/2010 | Cloonan et al. |
| 2011/0099393 A1 | 4/2011 | Tran et al. |
| 2011/0185263 A1 | 7/2011 | Chapman et al. |
| 2011/0302416 A1 | 12/2011 | Hoshen et al. |
| 2011/0318002 A1* | 12/2011 | Sitton ................ H04J 14/0247 |
| | | 398/58 |
| 2013/0128885 A1 | 5/2013 | Kardashov et al. |
| 2013/0209104 A1* | 8/2013 | Sitton ................ H04J 14/0247 |
| | | 398/58 |
| 2014/0317450 A1 | 10/2014 | Hess et al. |
| 2015/0092531 A1 | 4/2015 | Bernstein et al. |
| 2017/0187632 A1* | 6/2017 | Ko ..................... H04L 43/0876 |
| 2017/0302379 A1* | 10/2017 | Bernard ............. H04L 12/2865 |

\* cited by examiner

MULTIPLE CORE SOFTWARE FORWARDING

CLAIM OF PRIORITY

This application is a continuation in part of, and claims priority to, U.S. non-provisional patent application Ser. No. 17/556,733, filed Dec. 20, 2021, entitled "Multiple Core Software Forwarding," the contents of which are hereby incorporated by reference for all purposes as if fully set forth herein.

U.S. non-provisional patent application Ser. No. 17/556,733 is a continuation of, and claims priority to, U.S. non-provisional patent application Ser. No. 15/644,823, filed Jul. 10, 2017, entitled "Multiple Core Software Forwarding," the contents of which are hereby incorporated by reference for all purposes as if fully set forth herein.

U.S. non-provisional patent application Ser. No. 15/644,823 claims priority to U.S. provisional patent application Ser. No. 62/360,848, filed Jul. 11, 2016, entitled "Multiple Core Software Forwarding," the contents of which are hereby incorporated by reference for all purposes as if fully set forth herein.

FIELD OF THE INVENTION

Embodiments of the invention relate to processing packets transmitted within a Passive Optical Network (PON) using executable software.

BACKGROUND

A Converged Cable Access Platform (CCAP) allows service providers to offer a variety of services, such as cable television and network access, to subscribers. Data Over Cable Service Interface Specification (DOCSIS) is a telecommunications standard used to provide Internet access via a cable modem.

Currently, industry practice is to implement downstream forwarding in a CCAP environment in hardware such as Ternary Content-Addressable Memory (TCAMs) for classification and Field-Programmable Gate Arrays (FPGAs) for packet scheduling and replication.

A Passive Optical Network (PON) may also be used to provide broadband Internet or network access to customers. In a PON, an optical line terminal (OLT) software application and/or a broadband network gateway (BNG) software application may execute at a cable headend or as part of a cloud-based deployment at a location accessible by the cable headend over the Internet. An OLT software application performs OLT functions for a set of optical network units (ONUs). A broadband network gateway (BNG) software application performs BNG functions for a set of ONUs.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
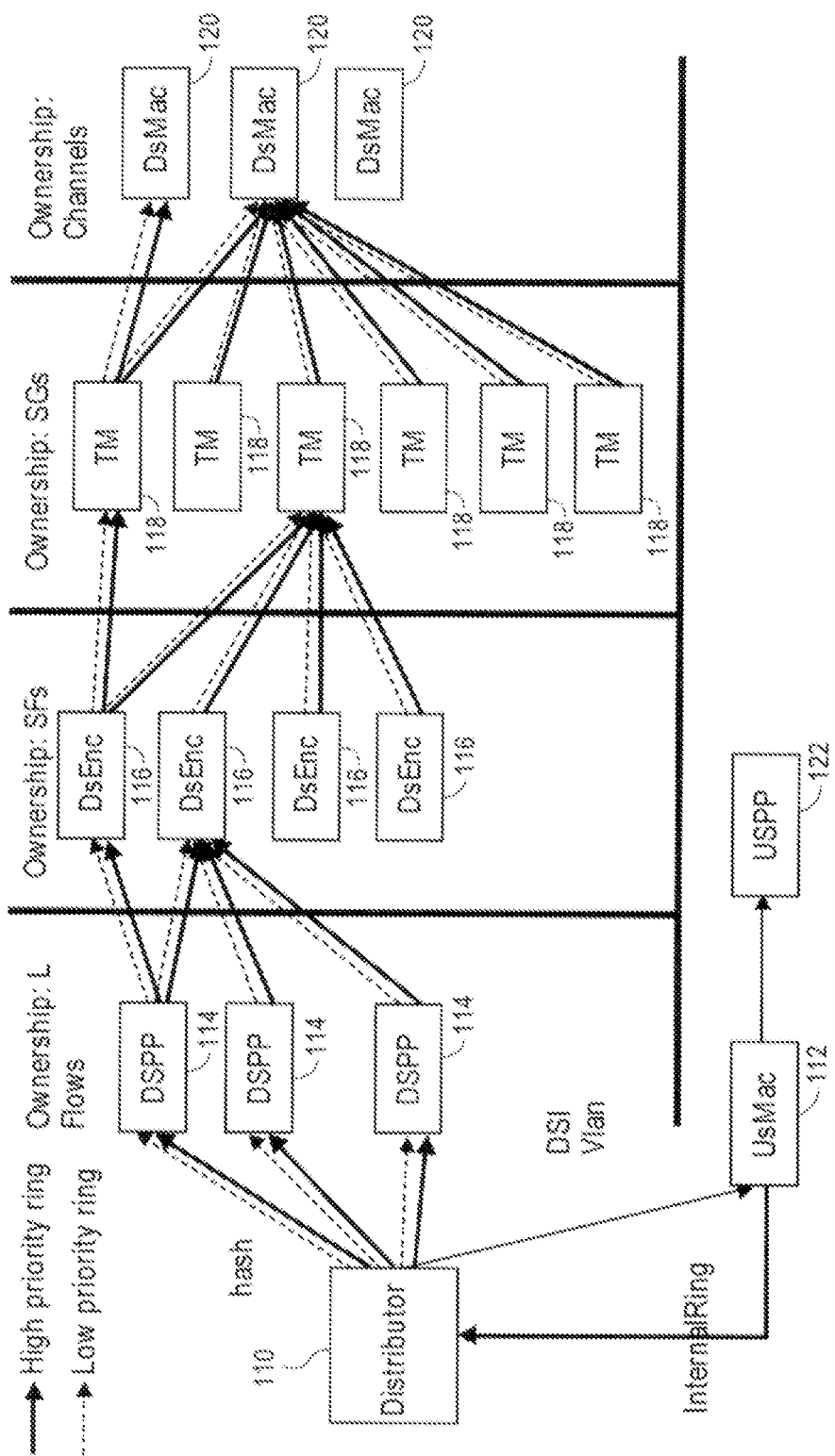
FIG. 1 is an illustration of operational stages in accordance with an embodiment of the invention.

Approaches for processing packets using executable software are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Embodiments of the invention may be employed in a variety of different environments, such as a hardware-based CCAP environment, a software-based CCAP environment (known as a virtual CCAP) environment, and/or a Passive Optical Network (PON) environment. Certain implementation details may differ based on what environment that invention is being deployed; those details will be discussed herein. Also note that embodiments may operate in multiple environments, for example a single cable headend or as part of a cloud-based deployment of an embodiment may operate in two or more of a hardware-based CCAP environment, a virtual CCAP environment, and a PON environment. In this way, a single cable headend or service provider may provide service to customers using a virtual CCAP and a PON environment; services to different environments may be supported by way of software executing as part of an execution instance management platform, such as but not limited to a software pod or a Kubernetes container.

A virtual Converged Cable Access Platform (CCAP) is software that performs the functions of a hardware-based CCAP. The virtual CCAP may execute on hardware components that include a commercial off-the-shelf switch/router and one or more off-the-shelf computing servers. A commercial example of a virtual CCAP is CableOS, available from Harmonic, Inc. of San Jose, California. A virtual CCAP may perform services over or in tandem with a PON.

In a hardware-based CCAP environment or a virtual CCAP environment, embodiments of the invention allow for dividing the functions of DOCSIS downstream MAC Layer forwarding among multiple software cores of a commercial off-the-shelf switch/router (terms a 'Core Routing Engine component' or CRE in certain embodiments) of a virtual CCAP. Certain embodiments make use of the Data Path Development Kit (DPDK), which features zero-locking rings between cores. Such zero-locking rings contain pointers to shared DPDK Message Buffers or "MBUFs". Each MBUF comprises a header that contains DPDK MBUF library information as well a structure between the end of the MBUF header and the start of packet data called the MBUF "headroom." Embodiments call for storing information useful for DOCSIS forwarding in the MBUF headroom.

Embodiments of the invention may also be used for packet processing in a PON environment. In a PON environment, one or more received packets are classified to a particular PON system component (a PON system component may correspond to any single or group of physical and/or software entities within the PON environment). Thereafter, the packets classified to the same PON system component are processed in the same manner, e.g., on a particular physical CPU core (i.e., a physical processor) of a multiple physical CPU core hardware device. The packets classified to the same PON system component may be restricted from executing on any physical CPU core but that particular physical CPU core permitted to process packets for that PON system component.

Embodiments of the invention may use DPDK "Single Producer Single Consumer" rings to avoid thread synchronization between multiple producers or multiple consumers. Each thread repeatedly checks for the availability of any packets on each of the rings it receives.

FIG. 1 is an illustration of operational stages in accordance with certain embodiments of the invention. The illustration of FIG. 1 depicts operational stages can be perform work in different technical environments, such as a DOCSIS environment and a PON environment. As explained below, not all operational stages shown in FIG. 1 need be present for each operational environment; for example, embodiments in a PON environment or other environments where encryption is not performed need not perform encryption need not include DsEnc threads 116.

Distributor thread 110 of FIG. 1 is a thread which is responsible for receiving all incoming physical packets from the trunk Ethernet port connected to a commercial off-the-shelf switch/router (which in an embodiment may correspond to a Core Routing Engine (CRE)). The incoming physical packets received by distributor thread 110 include downstream packets carried by the Internet as well as upstream packets, such as upstream packets sent from a Remote PHY Device (RPD) or an Optical Network Terminal (ONT).

While embodiments of the invention may chiefly be described in terms of distributor thread 110 being implemented by software, note that other embodiments of the invention may perform the functions of distributor thread 110 in hardware. For example, certain embodiments may employ a network card (NIC) which performs the functions attributed to distributor thread 110. Such an embodiment may include a distributor component, which is a hardware device, such as but not limited to a NIC, which is configured to perform the functions attributed to distributor thread 110 as discussed herein. Other embodiments of the invention may employ a distributor component which performs the functions attributed to distributor thread 110 as discussed herein partially in a hardware component and partially in software.

Upstream packets may be encapsulated in the L2TPv3 protocol and are addressed to an L2TPv3 Logical Control Connection Entity (LCCE) that is implemented on commercial off-the-shelf switch/router (e.g., a Core Router Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing. Distributor thread 110 forwards all other received packets to one of a plurality of DSPP threads 114, which are threads that are responsible for downstream processing. To do so, distributor thread 110 may hash the source and destination MAC and/or IP addresses to balance load among the DSPP threads 114.

Execution Environments

Prior to discussing the operation of downstream and upstream data flows, it will be helpful to appreciate the relationship between operational stages depicted by FIG. 1 and logical cores. The operational stages shown in FIG. 1 correspond to the distributor stage (corresponding to the distributor component), the "Downstream Packet Processor" (DSPP) stage (corresponding to the plurality of DSPP threads 114), the "Downstream Encryption" (DsEnc) stage (corresponding to the plurality of DsEnc threads 116), the "Traffic Manager" (TM) stage (corresponding to the plurality of TM threads 118), the "Downstream Medium Access Control" (DsMac) stage (corresponding to the plurality of DsMac threads 120), the "Upstream Medium Access Control" (UsMac) stage (corresponding to UsMac thread 112), and the "Upstream Packet Processor" (USPP) stage (correspond to UsMac component). The functional components within each of these stages shall be discussed in greater detail below. As used herein, a logical core includes a physical CPU core, such as Intel®'s Hyper-Threading Technology, or a virtual CPU core.

In certain embodiments of the invention, each operational stage depicted in FIG. 1 may execute on separate logical cores. In other embodiments of the invention, two or more operational stages depicted in FIG. 1 may execute on a single logical core.

In yet other embodiments of the invention, all operational stages depicted in FIG. 1 may execute on a single logical core, with either manually scheduled (e.g., round-robin) or time-sliced concurrent scheduling of the stages on the single core. Further embodiments of the invention may allow for a user to configure which logical core should execute each operational stage without limitation such that the user can configure a single logical core to execute all operational stages or a plurality of logical cores to each execute a different operational stage, for example.

Downstream Data Flows

Figure 2:
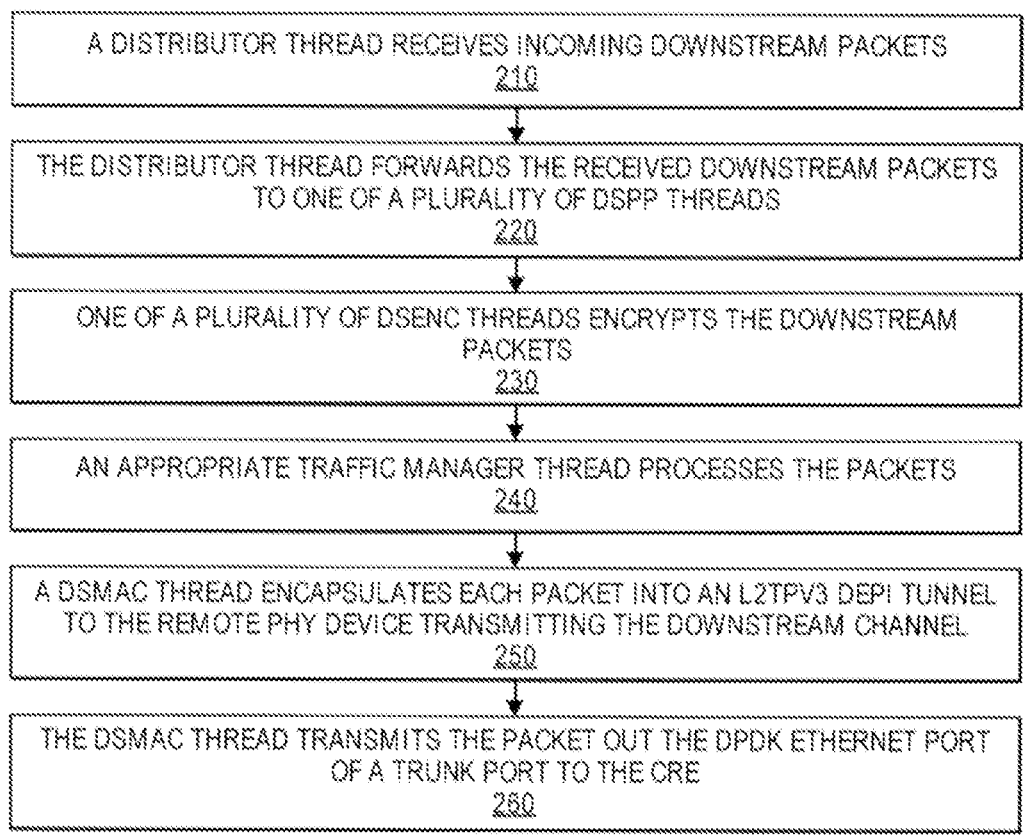
FIG. 2 is a flowchart illustrating the functional steps of downstream forwarding in accordance with an embodiment of the invention.
Figure 3:
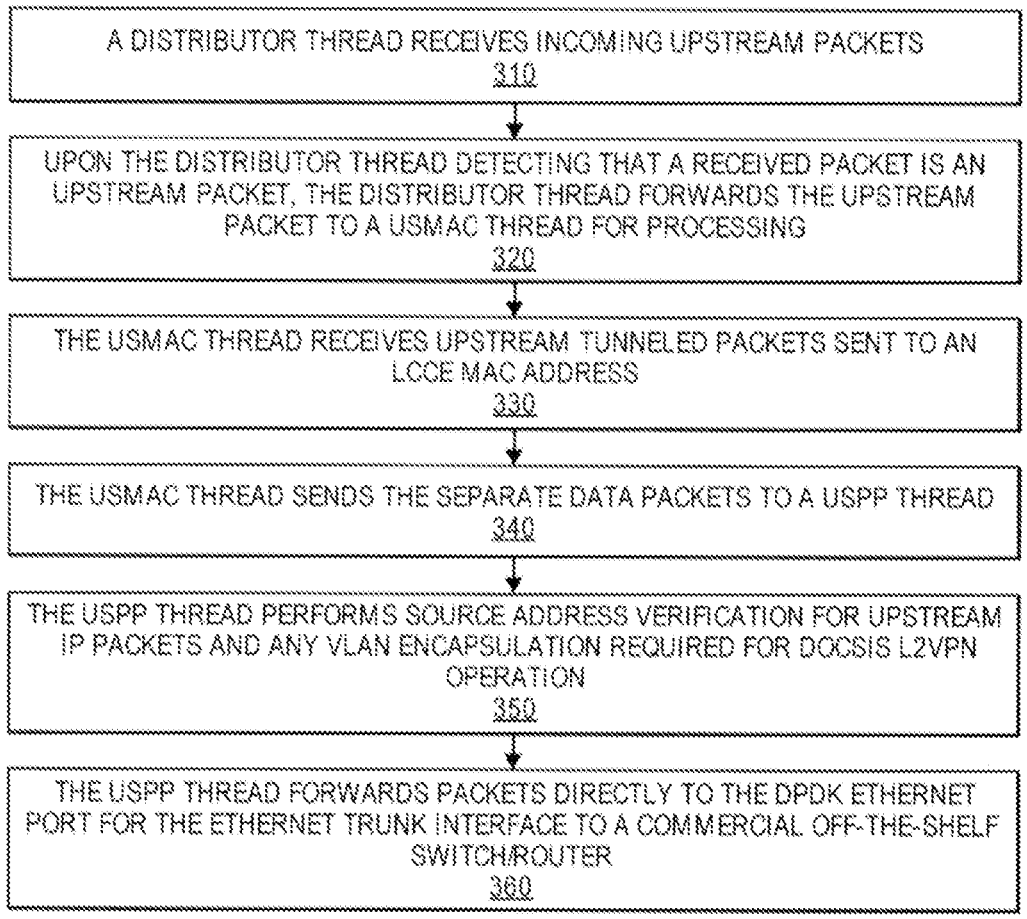
FIG. 3 is a flowchart illustrating the functional steps of upstream forwarding in accordance with an embodiment of the invention.

FIG. 2 is a flowchart illustrating the functional steps of downstream forwarding in accordance with an embodiment of the invention. The downstream forwarding of FIG. 2 may be performed in a PON environment or a DOCSIS environment. The steps of FIG. 2 shall be explained below with reference to FIG. 1. The order of the performance of the steps of FIG. 2 may differ from embodiment to embodiment, as the order depicted in the steps and operational stages of FIGS. 1-3 is merely illustrative of one approach. Other embodiments of the invention may perform the operational stages and/or steps discussed herein relative to FIGS. 1-3 in a different order or indeed in parallel.

In step 210, distributor thread 110 receives incoming downstream physical packets, e.g., packets carried by the Internet.

Thereafter, in step 220, distributor thread 110 forwards the received downstream packets to one of a plurality of DSPP threads 114. A DSPP thread 114 is responsible for classifying a downstream packet to a service flow. All DSPP threads 114 have access to the same database of downstream classifiers. A DSPP thread 114 classifies a packet using an internal index called the Traffic Manager Flow Index or TmFlowIndex. All DSPP threads 114 and all TM threads 118 use the same TmFlowIndex A DSPP thread 114 stores the TmFlowIndex to which it classified the packet into MBUF headroom field.

In the DOCSIS protocol, every downstream service flow belongs to a single DOCSIS "MAC-Domain", which is identified by embodiments of the invention by a MAC Domain ID. DSPP thread 114 may store the MAC Domain ID of a packet's service flow in the MBUF headroom.

DOCSIS also defines the concept of a "MAC-Domain downstream service group" (MD-DSSG) which comprises the set of downstream channels in a MAC-Domain that reach a single CM. DSPP thread 114 of an embodiment may place into an MBUF headroom a system-unique identifier of the MD-DSSG which contains the packet's service flow. The MAC-Domain ID or MD-DSSG identifier are used to select to which TM thread DSENC forwards a downstream packet it receives from DSPP thread 114.

In step 230, if encryption is configured to be performed, one of a plurality of DsEnc threads 116 encrypts the downstream packets. Note that not all embodiments may perform encryption in step 230. For example, in certain PON implementations, encryption is not performed, and step 230 may be omitted.

In step 230, a particular DsEnc thread 116 may encrypt a downstream packet by using a shared hardware component such as the Intel® QuickAssist module. Multiple DsEnc threads 116 may share only one or two hardware modules, e.g., one or two per commercial off-the-shelf switch/router (which may be termed a 'Core Server' or CS in an embodiment). Accordingly, the queueing delay to the shared encrypting mechanism may be variable. To reduce the variability in delay of outgoing packets after an aggregate rate limiting function of the Traffic Manager, encryption by DsEnc thread 116 is performed before Traffic Management scheduling.

Certain embodiments of the invention advantageously perform encryption before the scheduling of packets. Current industry CMTS implementations schedule packets and then perform encryption afterwards in commercial DOCSIS chips, such as but not limited to Broadcom Corporation's BCM3215 chip, which performs the downstream Media Access Control (MAC) functions. To reduce the incidence of cache misses in DsEnc threads 116, each DOCSIS service flow is assigned to a single DsEnc thread 116. Thus, the keying information and statistics for a service flow are kept in only one Dspp core L1 cache. The corresponding DSPP-to-DsEnc ring for each Dspp thread 114 is communicated to a Dspp thread 114 when a service flow is added.

In an embodiment, the functionality described above with respect to the plurality of DsEnc threads may be implemented, at least partially, in hardware rather than exclusively by software. In such an embodiment, the functionality described herein as being attributed to or performed by plurality of DsEnc threads 116 may be performed by one or more DsEnc hardware components, which may correspond to a hardware card that accelerates the operations of encrypting downstream packets. As used herein, the term 'DsEnc component' includes both a software implementation, a hardware implementation, and an implementation involving both hardware and software. While embodiments shall chiefly be described in terms of DsEnc threads 116 being implemented in software, it shall be understood to those in the art that other embodiments may be employed where DsEnc threads 116 are implemented partially or wholly by hardware.

Thereafter, in step 240, an appropriate TM thread 118 processes the packet. For DOCSIS communications, each DOCSIS MAC Domain is assigned to a single Traffic Manager (TM) thread 118; similarly, for PON communications, each service flow classified to the same PON port is assigned to a single Traffic Manager TM thread 118. A TM thread 118 enqueues packets on a per-flow queue and schedules packets for transmission using a multiple-level hierarchical packet scheduler. Each Service Flow (SF), and hence each TmFlowIndex, belongs to a single MAC Domain (in the case of DOCSIS communications) or a single PON port (for packets conveyed over a PON). When the control plane adds a new TmFlowIndex to a DsEnc thread 116, the control plane also provides a pointer to the proper DsEnc-to-TM ring to reach the TM thread 118 assigned to perform work for the service flow's MAC Domain (in the case of DOCSIS communications) or PON port (in the case of communications conveyed over a PON).

For those embodiments handling DOCSIS communications, embodiments of the invention call for the assignment of MAC Domains to a TM thread 118. This is because most MAC Domains consist of highly overlapping Downstream Channel Sets (DCS) with shared downstream channels. Keeping all scheduling of DCSs that share the same channel in the same channel set avoids inter-core concurrent access to memory data structures. A TM thread 118 schedules each packet to a particular downstream RF channel.

If a MAC Domain is composed of disjoint (i.e., non-overlapping) downstream service groups (SGs), then embodiments may assign the disjoint sets of SGs to different TM threads 118 and still avoid inter-core co-ordination of per-packet scheduling information.

For those embodiments handling communications over a PON, embodiments of the invention call for the assignment of PON component to a TM thread 118.

In step 250, a DsMac thread 120 encapsulates a packet into an L2TPv3 DEPI tunnel to the Remote Phy Device (RPD) transmitting the downstream channel. Each downstream channel is assigned to a single DsMac thread 120. A single DsMac thread 120 may be used for each channel to maintain single-core operation of per-packet sequence numbers. Such per-packet sequence numbers include an MPEG sequence number or a Packet Streaming Protocol (PSP) sequence number.

After encapsulating a packet, in step 260, the DsMac thread 120 transmits the packet out the DPDK Ethernet port of a trunk port to the CRE.

Advantageously, distributor thread 110, the plurality of DSPP threads 114, the plurality of DsEnc threads 116, the plurality of TM threads 118, and the plurality of DsMac threads 120 all share the same multi-core CPU and the same hardware bus of chip signals from CPU to memory.

Upstream Data Flows

FIG. 3 is a flowchart illustrating the functional steps of upstream forwarding in accordance with an embodiment of the invention. FIG. 3 depicts steps that may be performed with DOCSIS communications or communications conveyed over a PON. The steps of FIG. 3 shall be explained below with reference to FIG. 1.

In step 310, distributor thread 110 receives incoming upstream packets, e.g., packets tunneled from a Remote Phy Device (RPD) or from a PON component.

In step 320, upon distributor thread 110 detecting that a received packet is an upstream packet, distributor thread 110 forwards the upstream packet to UsMac thread 112 for processing. Upstream packets may be encapsulated in the L2TPv3 protocol and are addressed to an L2TPv3 Logical Control Connection Entity (LCCE) that is implemented on commercial off-the-shelf switch/router (e.g., a Core Routing Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing.

In step 330, UsMac thread 112 receives upstream tunneled packets sent to an LCCE MAC Address. UsMac thread 112 reassembles the sequences of upstream bursts from each upstream channel and separates the bursts into separate upstream packets, each in their own MBUF.

Thereafter, in step 340, UsMac thread 112 sends the separate data packets to a USPP thread 122. UsMac thread 112 separately recognizes upstream Bandwidth Request Mac Management Messages (MMMs) and forwards them to a scheduling software application (not shown) for upstream scheduling. UsMac thread 112 also recognizes other upstream MAC management messages and forwards them to a software process for handling.

In step 350, USPP thread 122 performs Source Address Verification for upstream IP packets and any VLAN encapsulation required for L2VPN operation.

In an embodiment, the functionality described above with respect to USPP thread 122 may be implemented, at least partially, in hardware rather than exclusively by software. In such an embodiment, the functionality described herein as being attributed to or performed by USPP thread 122 may be performed by one or more USPP hardware components, which may correspond to a hardware card that accelerates the operation of encrypting upstream packets. As used herein, the term 'USPP component' and 'USPP stage' includes both a software implementation, a hardware implementation, and an implementation involving both hardware and software. While embodiments shall chiefly be described in terms of USPP thread 122 being implemented in software, it shall be understood to those in the art that other embodiments may be employed where USPP thread 122 is implemented partially or wholly by hardware.

In step 260, USPP thread 122 forwards packets directly to the DPDK Ethernet port for the Ethernet trunk interface to a commercial off-the-shelf switch/router (which may be a CRE in an embodiment).

Multiple pairs of UsMac thread 122/USPP thread 122 may be created, in which case an LCCE IP address is advantageously assigned to a single UsMac thread 112 and distributor thread 110 forwards upstream packets to the appropriate UsMac thread 122/USPP thread 122 pair based on the destination LCCE IP address, which avoids duplicating upstream per-CM Source Address Verification information and per-service-flow statistic information between cores, thereby reducing the probability of L1 cache misses.

The assignment by embodiments of certain DOCSIS components to a particular instance of a processing stage on a CPU core is unique and represents an inventive leap to the CMTS industry. The usual software industry mechanism for dividing work among multiple CPU cores is with symmetric multiprocessing and load balancing among the cores, with little or no knowledge of the application domain of the software processes. Examples of assignment of DOCSIS components to processing stages include: assigning a DOCSIS service flow to one DSENC stage, assigning a DOCSIS MAC Doman or MAC Domain downstream service group to one TM stage, assigning a DOCSIS downstream channel to one DSMAC stage, assigning a DOCSIS LCCE to one US MAC stage, and assigning a DOSCIS service flow to one USPP stage.

The assignment by embodiments of certain PON components to a particular instance of a processing stage on a CPU core is also unique and represents an inventive leap. The usual software industry mechanism for dividing work among multiple CPU cores in a PON network is with symmetric multiprocessing and load balancing among the cores, with little or no knowledge of the application domain of the software processes. Examples of assignment of PON components to processing stages include: assigning a service flow classified to the same PON port to one DSENC stage, to one TM stage, to one DSMAC stage, to one US MAC stage, and/or to one USPP stage.

High and Low Priority Rings

During high-capacity operation, any thread instance may become too busy to keep up with incoming packets, which may cause congestion and eventual data loss of MBUFs on the rings going into those thread instances. Certain embodiments may employ data rings of varying degrees of priority so that lower priority traffic becomes congested and suffers drops before higher priority rings. Embodiments may employ data rings of any number of degrees of priority, e.g., two degrees may exist so that data rings may only be assigned a 'high' or 'low' priority, or three or more degrees may exist so that any level of granularity may be used to order data rings based on priority.

High priority rings may be advantageously used for certain classes of traffic. For example, in an embodiment, in decreasing order of priority, high priority rings are advantageously used for the following classes of traffic: Downstream DOCSIS maps and UCDs, Upstream Bandwidth Requests, Downstream and Upstream Voice payload, and finally all other DOCSIS Mac Management Messages.

PON Embodiments

Embodiments of the invention may be used in non-DOCSIS access technologies, such as PON. In embodiments implemented in a PON environment, certain implementation details may differ than the concrete examples discussed above. Embodiments may also operate in multiple environments, e.g., one or more of a single cable headend, a cloud-based deployment, a hardware-based environment, a virtual environment, or any combination thereof. In this way, a single service provider may provide service to customers using a virtual CCAP and a virtual BNG or a combined virtual access implementation; services to different environments may be supported by way of software executing as part of an execution instance management platform, such as but not limited to a software pod or a Kubernetes container.

Not all operational stages shown in FIG. 1 need be present for each operational environment; for example, embodiments in a PON environment or other environments where encryption is not performed need not perform encryption need not include DsEnc threads 116.

The order of the performance of the steps of FIG. 2 may differ from embodiment to embodiment, as the order depicted in the steps and operational stages of FIGS. 1-3 is merely illustrative of one approach. Other embodiments of the invention may perform the operational stages and/or steps discussed herein relative to FIGS. 1-3 in a different order or indeed in parallel.

PON and other access technologies may be implemented with the same flexible architecture realized by embodiments by breaking the functional pipeline into stages and either (a) instantiating each stage in a separate thread, or (b) combine multiple stages into a single thread, or (c) instantiating multiple instances of the same stage over multiple threads according to the required throughput needed. The operation of the functional pipeline may be configured by provisioning the path across the pipeline stages for each entity (such as a Cable Modem (CM) or ONU service flow (SF) and the like)

such that each stage implements the correct lookups to find what is the next stage for each packet and enqueue it to the correct queue accordingly.

The flexible architecture of an embodiment should ensure that each logical flow maintains order within the pipeline and has a single path. Load balancing mechanisms could be employed by embodiments. Embodiments may also accommodate re-provisioning a new path through the pipeline during runtime with, implementation depending, minimal or no packet loss at all.

Implementing Hardware

Figure 4:
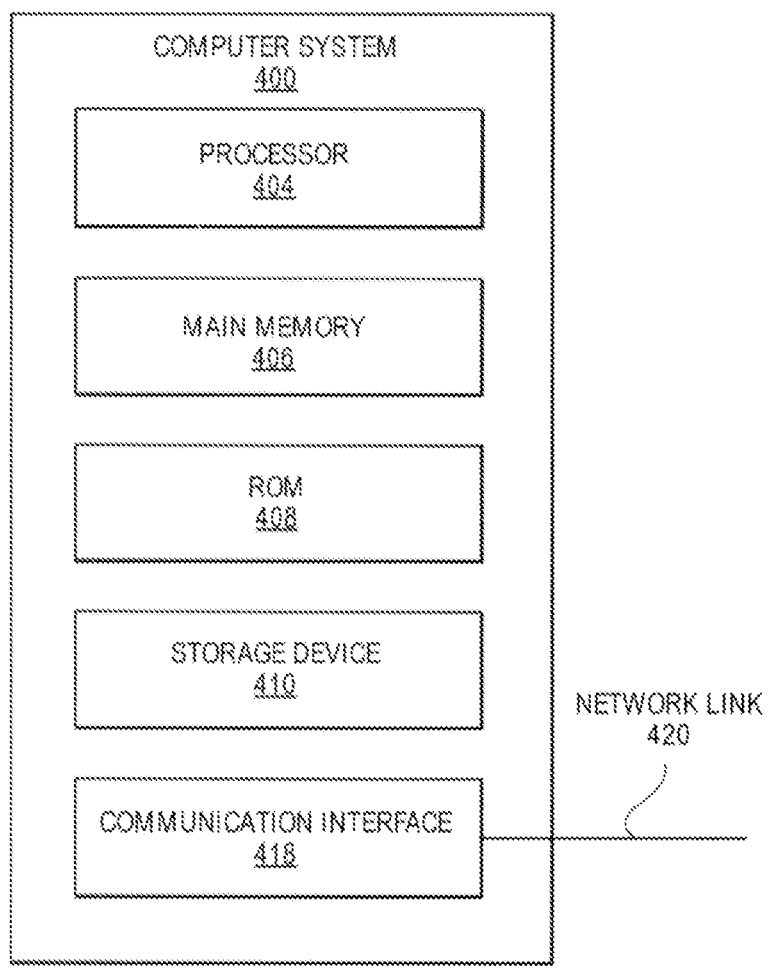
FIG. 4 is a block diagram that illustrates a computer system upon which an embodiment of the invention may be implemented.

In an embodiment, a virtual Converged Cable Access Platform (CCAP) which implements the steps of one or more of FIG. 2 and FIG. 3 may be executed by a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random-access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 404 for execution. Non-limiting, illustrative examples of non-transitory computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for processing packets transmitted within a Passive Optical Network (PON), which when executed, cause:
    classifying one or more packets, of a plurality of received packets, to a particular PON system component; and
    processing the one or more packets classified to the same PON system component on a single physical or virtual processor, wherein the one or more packets classified to the same PON system component are forwarded between a sequence of one or more software stages which are each executed on the single physical or virtual processor.

2. The non-transitory computer-readable storage medium of claim 1, wherein at least one of the one or more software stages is implemented by a single operating system thread.

3. The non-transitory computer-readable storage medium of claim 1, wherein the plurality of received packets are distributed in a load-balancing manner amongst a set of entities responsible for classifying the plurality of received packets to a particular PON system component.

4. The non-transitory computer-readable storage medium of claim 3, wherein execution of the one or more sequences of instructions further cause:
  after an operational stage in which the plurality of received packets are distributed in a load-balancing manner amongst a set of entities responsible for classifying the plurality of received packets to a particular PON system component, the set of entities classifying the one or more packets to a particular PON system component in a classification stage.

5. The non-transitory computer-readable storage medium of claim 1, wherein a separate traffic management stage enqueues downstream packets and schedules the downstream packets for transmission.

6. The non-transitory computer-readable storage medium of claim 1, wherein all packets classified to a service flow in the same PON port are processed by the same instance of a traffic management stage.

7. The non-transitory computer-readable storage medium of claim 1, wherein the one or more packets classified to the same PON system component are forwarded between a sequence of one or more software stages that each be configured to execute on separate logical cores.

8. The non-transitory computer-readable storage medium of claim 1, wherein the plurality of received packets are downstream packets.

9. The non-transitory computer-readable storage medium of claim 1, wherein the plurality of received packets are upstream packets.

10. The non-transitory computer-readable storage medium of claim 1, wherein said sequence of one or more software stages includes an Upstream Packet Processor (USPP) stage.

11. An apparatus for processing packets transmitted within a Passive Optical Network (PON), comprising:
  two or more processors; and
  one or more non-transitory computer-readable storage mediums storing one or more sequences of instructions, which when executed, cause:
    classifying one or more packets, of a plurality of received packets, to a particular PON system component; and
    processing the one or more packets classified to the same PON system component on a single physical or virtual processor of said apparatus, wherein the one or more packets classified to the same PON system component are forwarded between a sequence of one or more software stages which are each executed on the single single physical or virtual processor.

12. The apparatus of claim 11, wherein the plurality of received packets are distributed in a load-balancing manner amongst a set of entities responsible for classifying the plurality of received packets to a particular PON system component.

13. The apparatus of claim 11, wherein a separate traffic management stage enqueues downstream packets and schedules the downstream packets for transmission.

14. The apparatus of claim 11, wherein all packets classified to a service flow in the same PON port are processed by the same instance of a traffic management stage.

15. The apparatus of claim 11, wherein the one or more packets classified to the same PON system component are forwarded between a sequence of one or more software stages that each be configured to execute on separate logical cores.

16. The apparatus of claim 11, wherein the plurality of received packets are downstream packets.

17. The apparatus of claim 11, wherein the plurality of received packets are upstream packets.

18. The apparatus of claim 11, wherein said sequence of one or more software stages includes an Upstream Packet Processor (USPP) stage.

19. A method for processing packets transmitted within a Passive Optical Network (PON), comprising:
  classifying one or more packets, of a plurality of received packets, to a particular PON system component; and
  processing the one or more packets classified to the same PON system component on a single physical or virtual processor, wherein said one or more packets classified to the same PON system component are forwarded between a sequence of one or more software stages which are each executed on the single physical or virtual processor.

20. The method of claim 19, wherein at least one of the one or more software stages is implemented by a single operating system thread.

21. The method of claim 19, wherein the plurality of received packets are distributed in a load-balancing manner amongst a set of entities responsible for classifying the plurality of received packets to a particular PON system component.

22. The method of claim 21, further comprising:
  after an operational stage in which the plurality of received packets are distributed in a load-balancing manner amongst a set of entities responsible for classifying the plurality of received packets to a particular PON system component, the set of entities classifying the one or more packets to a particular PON system component in a classification stage.

23. The method of claim 19, wherein a separate traffic management stage enqueues downstream packets and schedules the downstream packets for transmission.

24. The method of claim 19, wherein all packets classified to a service flow in the same PON port are processed by the same instance of a traffic management stage.

25. The method of claim 19, wherein the one or more packets classified to the same PON system component are forwarded between a sequence of one or more software stages that each be configured to execute on separate logical cores.

26. The method of claim 19, wherein the plurality of received packets are downstream packets.

27. The method of claim 19, wherein the plurality of received packets are upstream packets.

28. The method of claim 19, wherein said sequence of one or more software stages includes an Upstream Packet Processor (USPP) stage.

* * * * *